(12) United States Patent
Yoshida

(10) Patent No.: US 6,888,933 B2
(45) Date of Patent: May 3, 2005

(54) COMMUNICATION APPARATUS FOR SELECTING A COMMUNICATION PROTOCOL COMPATIBLE TO A PARTNER STATION AND EXECUTING THE SELECTED PROTOCOL

(75) Inventor: Takehiro Yoshida, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 08/825,585

(22) Filed: Apr. 1, 1997

(65) Prior Publication Data

US 2002/0057771 A1 May 16, 2002

Related U.S. Application Data

(63) Continuation of application No. 08/395,588, filed on Feb. 28, 1995, now abandoned.

(30) Foreign Application Priority Data

Mar. 1, 1994 (JP) .............................................. 6-031386

(51) Int. Cl.[7] ............................................. H04M 11/00
(52) U.S. Cl. .............................. 379/100.09; 379/93.34; 379/142.06; 358/439
(58) Field of Search ....................... 379/100.01, 100.05, 379/100.06, 100.09, 100.14–100.15, 93.29–93.34, 142.06, 142, 279, 100, 355, 356, 354, 88, 89, 93, 96, 97, 98, 90; 358/400, 434, 435, 438, 439, 442, 468, 440; 375/222

(56) References Cited

U.S. PATENT DOCUMENTS

| | | | | |
|---|---|---|---|---|
| 4,729,033 A | | 3/1988 | Yoshida | 358/257 |
| 4,788,657 A | * | 11/1988 | Douglas et al. | 379/93.29 |
| 4,815,121 A | | 3/1989 | Yoshida | 379/100 |
| 4,823,375 A | | 4/1989 | Yoshida | 379/100 |
| 4,910,506 A | | 3/1990 | Yoshida et al. | 358/400 |
| 4,942,598 A | * | 7/1990 | Davis | 379/142 |
| 4,961,185 A | * | 10/1990 | Sawada | 358/442 |
| 5,128,985 A | | 7/1992 | Yoshida et al. | 379/100 |
| 5,199,071 A | * | 3/1993 | Abe et al. | 379/93.34 |
| 5,216,517 A | * | 6/1993 | Kinoshita et al. | 358/400 |
| 5,274,467 A | * | 12/1993 | Takehiro et al. | 358/440 |
| 5,303,066 A | * | 4/1994 | Kawaguchi | 358/434 |
| 5,307,179 A | | 4/1994 | Yoshida | 358/440 |
| 5,361,296 A | * | 11/1994 | Reyes et al. | 379/93.29 |
| 5,388,150 A | * | 2/1995 | Schneyer et al. | 379/89 |
| 5,438,614 A | * | 8/1995 | Rozman | 379/93 |
| 5,442,686 A | * | 8/1995 | Wada et al. | 379/100.06 |
| 5,450,483 A | * | 9/1995 | Williams | 379/279 |
| 5,471,522 A | * | 11/1995 | Sells et al. | 379/100 |
| 5,517,324 A | * | 5/1996 | Fite, Jr. et al. | 358/434 |
| 5,517,557 A | * | 5/1996 | Tanaka | 379/142 |
| 5,600,712 A | * | 2/1997 | Hanson et al. | 379/142 |
| 5,661,568 A | * | 8/1997 | Ueno | 358/435 |
| 5,696,598 A | | 12/1997 | Yoshida et al. | 358/434 |
| 5,726,765 A | * | 3/1998 | Yoshida et al. | 379/93.33 |
| 5,960,068 A | | 9/1999 | Yoshida et al. | 379/100.15 |

FOREIGN PATENT DOCUMENTS

| | | | | |
|---|---|---|---|---|
| JP | 62-100074 | * | 10/1987 | |
| JP | 05075820 A | * | 3/1993 | H04N/1/32 |

* cited by examiner

Primary Examiner—George Eng
(74) Attorney, Agent, or Firm—Fitzpatrick, Cella, Harper & Scinto (57) ABSTRACT

A communication apparatus includes a first detection circuit which detects a call signal, and a second detection circuit detects information of a partner station sent between call signals. A memory circuit stores information of a communication system of the partner station in association with the information of the partner station. A reading circuit reads the information of the communication system for the detected information of the partner station from the memory circuit in accordance with the information of the partner station detected by the second detection circuit at the time of the detection of the call signal and executes the communication protocol in accordance with the read information of the communication system.

7 Claims, 8 Drawing Sheets

COMMUNICATION APPARATUS FOR SELECTING A COMMUNICATION PROTOCOL COMPATIBLE TO A PARTNER STATION AND EXECUTING THE SELECTED PROTOCOL

This application is a continuation of application Ser. No. 08/395,588 filed on Feb. 28, 1995, abandoned.

BACKGROUND OF THE INVENTION

1. Field of the Invention

The present invention relates to a communication apparatus which selects a communication protocol compatible to a partner station and executing the selected protocol.

2. Related Background Art

In prior art apparatus of this type, a facsimile apparatus is known. The communication protocol of the facsimile apparatus includes G1, G2, G3 and G4 protocols. The G4 protocol uses a digital line and the G1, G2 and G3 protocols use an analog public line. In connecting a line to a communication partner station, the facsimile apparatus sequentially sends the G3 protocol, the G2 protocol and the G1 protocol and determines which protocol is to be executed in accordance with the presence or absence of acknowledge signals to the respective sent signals.

However, in the above facsimile apparatus, the G3 protocol, the G2 protocol and the G1 protocol are sequentially sent and the presence or absence of the acknowledge signal thereto is checked. Accordingly, a long time is required before the communication protocol to be executed is determined.

When a new communication protocol is added to the above protocols, a longer time is required before the communication protocol is determined. Where signals are to be sent and received to and from the partner station, if the reception of the signal is unsuccessful, a protocol of a lower function is selected even if the partner station actually has a protocol of a higher function.

Information on the communication function of the partner station may be registered, together with a telephone number of the partner station, in a one-touch dial key or an abbreviated dial key. Thus, when a call is made by depressing the dial key, the communication mode is selected in accordance with the registered information of the communication function (U.S. Pat. No. 4,910,506).

However, in the above U.S. Pat. No. 4,910,506, the information of the communication function registered in the one touch key is not useful for a received call.

SUMMARY OF THE INVENTION

It is an object of the present invention to provide an improved communication apparatus in the light of the above problems.

It is another object of the present invention to provide a communication apparatus which can rapidly determine a proper communication protocol at the reception of a call in accordance with a partner or calling station.

Other objects of the present invention will be apparent from the following detailed description and drawings of the preferred embodiments.

DETAILED DESCRIPTION OF THE PREFERRED EMBODIMENTS

[Embodiment 1]

Figures 1, 1A:
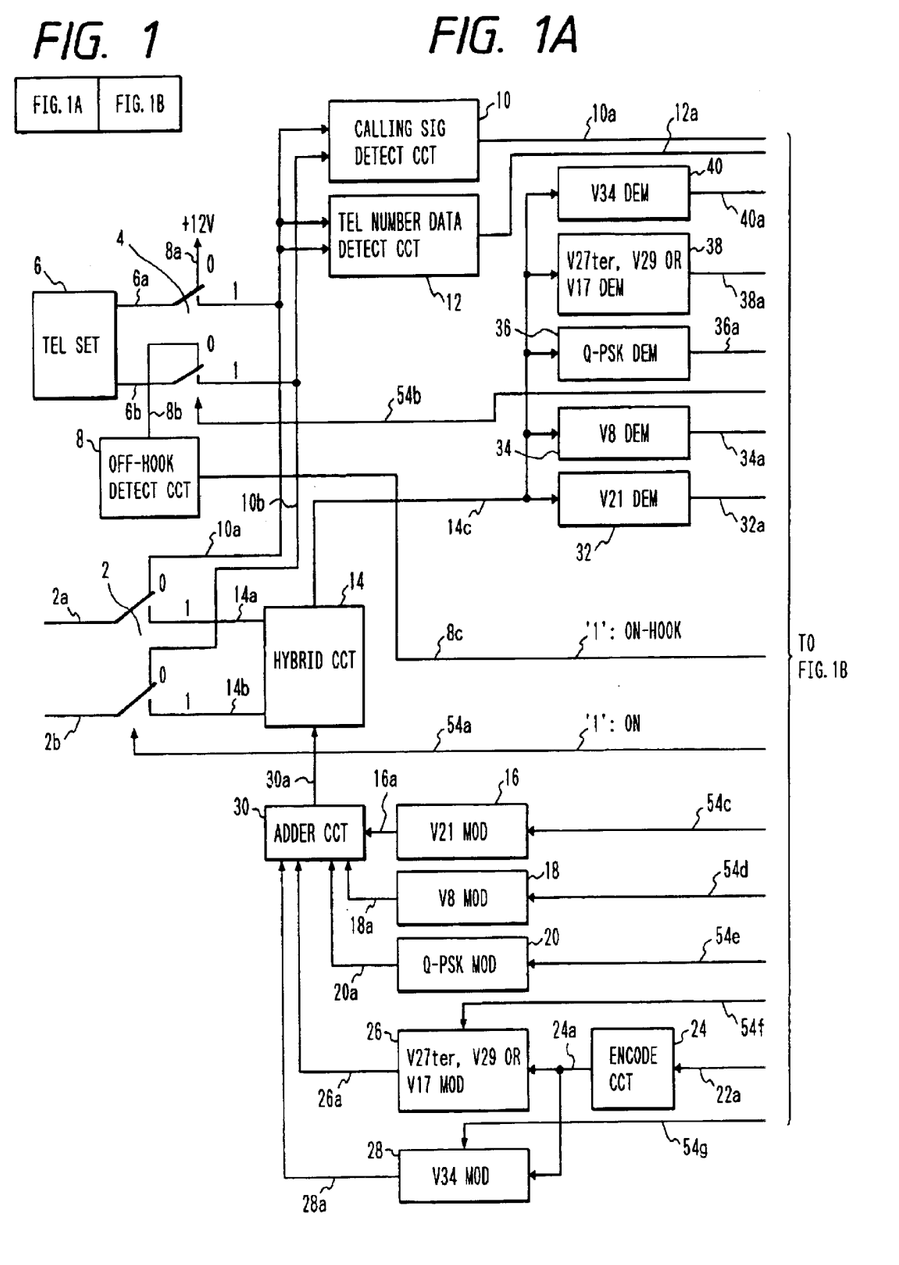
FIG. 1 is composed of FIGS. 1A and 1B and is a block diagram of a configuration of a facsimile apparatus according to the invention.
Figure 1B:
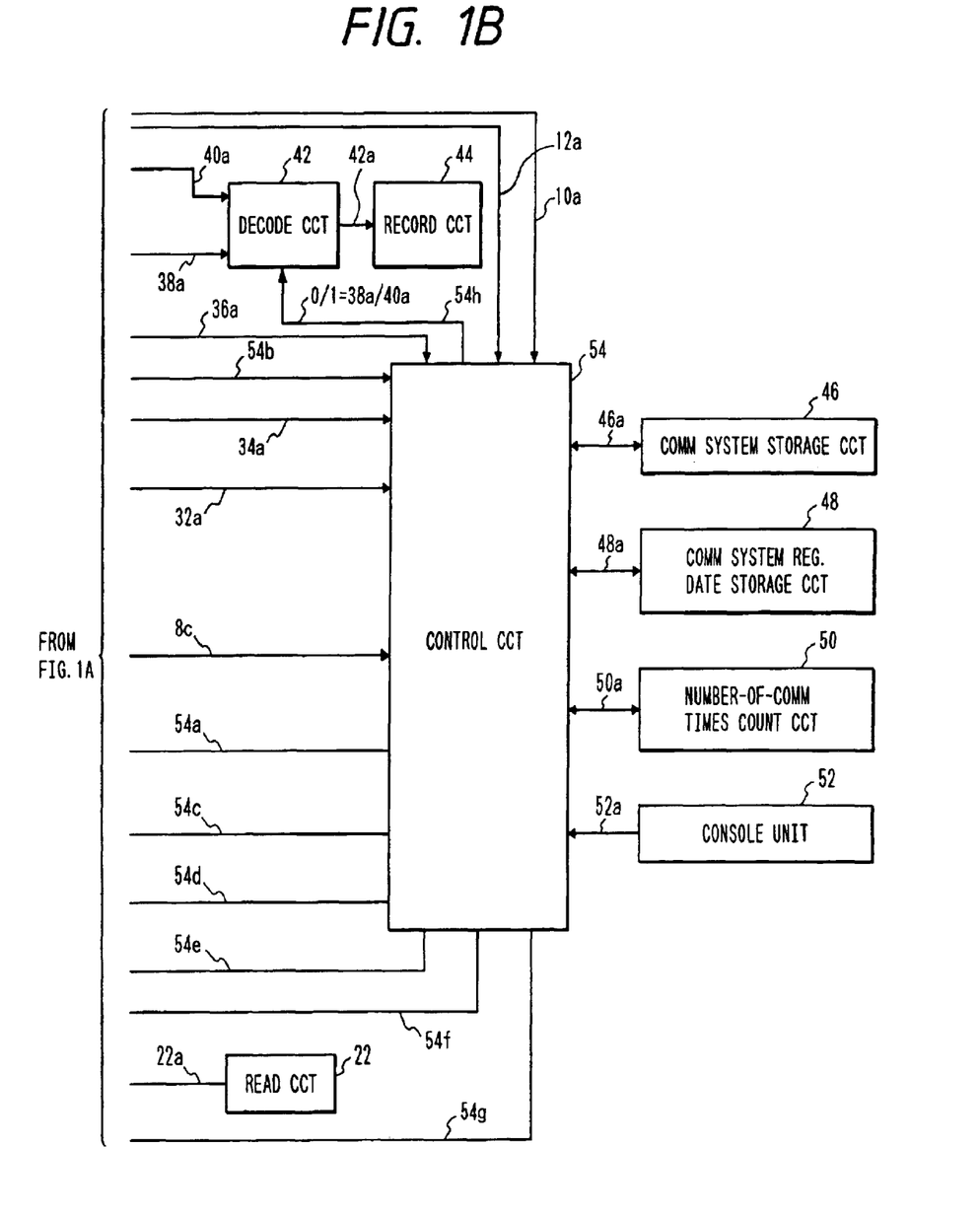

FIGS. 1A and 1B comprise a block diagram of an embodiment of a facsimile apparatus of the present invention.

In FIGS. 1A and 1B, numeral 2 denotes a CML relay which connects a telephone line (signal lines 2a, 2b) to a facsimile communication unit (signal lines 14a, 14b) when a signal level '1' is outputted to a signal line 54a, and connects the telephone line (signal lines 2a, 2b) to a telephone set (signal lines 10a, 10b) when a signal level '0' is outputted to the signal line 54a.

Numeral 4 denotes a TEL relay for detecting non-ringing call reception and an off-hook state during communication. It connects signal lines 6a, 6b to the signal lines 10a, 10b when the signal level '1' is outputted to a signal line 54b, and connects the signal lines 6a, 6b to signal lines 8a, 8b when the signal level '0' is outputted to the signal line 54b. When the signal level '0' is outputted to the signal line 54b, an off-hook detection circuit 8 determines whether the telephone set is in the off-hook state or not, and if it is in the off-hook state, it outputs the signal level '0' to a signal line 8c.

Numeral 6 denotes a telephone set.

Numeral 10 denotes a call signal detection circuit which receives the signals on the signal lines 10a and 10b, and outputs the signal level '1' to the signal line 10a when it detects a call signal and outputs the signal level '0' to the signal line 10a when it does not detect the call signal.

Numeral 12 denotes a circuit for detecting telephone number information sent between the call signals. It outputs the detected telephone number information to a signal line 12a.

Numeral 14 denotes a hybrid circuit for separating a transmission signal from a reception signal. Namely, the transmission signal on a signal line 30a is sent to the telephone line through signal lines 14a, 14b and the CML relay 2. A signal sent from the other station is outputted to a signal line 14c through the CML relay 2 and the signal lines 14a, 14b.

Numeral 16 denotes a modulator for modulating a signal in accordance with the CCITT Recommendation V.21. The modulator 16 receives a protocol signal on a signal line 54c, modulates it and outputs the modulated data to a signal line 16a.

Numeral 18 denotes a modulator for modulating a signal in accordance with the CCITT Recommendation V.8. The modulator 18 receives a protocol signal on a signal line 54d, modulates it and outputs the modulated data to a signal line 18a.

Numeral 20 denotes a Q·PSK modulator for a protocol between image transmission pages by using a V.34 high speed modem. The modulator 20 receives a protocol signal on the signal line 54*e*, modulates it and outputs the modulated data to a signal line 20*a*.

Numeral 22 denotes a read circuit which sequentially reads one line of image signal along a main scan direction from a transmission document sheet to generate a signal train representing black and white binary signals. It comprises an image pickup device such as a CCD (charge coupled device) and an optical system. The black and white binary signal train is outputted to a signal line 22*a*.

Numeral 24 denotes an encoder which receives the read data outputted to the signal line 22*a* and outputs encoded data (MH (modified Huffmann) encoded, MR (modified READ) encoded or MMR (modified modified READ) encoded data) to a signal line 24*a*.

Numeral 26 denotes a modulator which modulates a signal in accordance with the known CCITT Recommendation V.27 ter (differential phase modulation), V.29 (quadrature modulation) or V.17. The modulator 26 receives the signal on the signal line 24*a* when the signal level '1' is outputted to a signal line 54*f*, modulates it and outputs the modulated data to a signal line 26*a*. The modulator 26 does nothing when the signal level '0' is outputted to the signal line 54*f*.

Numeral 28 denotes a modulator which modulates a signal in accordance with the CCITT Recommendation V.34. When the signal level '1' is outputted to a signal line 54*g*, the modulator 28 receives the signal on the signal line 24*a*, modulates it and outputs the modulated data to a signal line 28*a*. The modulator 28 does nothing when the signal level '0' is outputted to the signal line 54*g*.

Numeral 30 denotes an adder circuit which receives the signals on the signal lines 16*a*, 18*a*, 20*a*, 26*a* and 28*a* and outputs a sum signal to a signal line 30*a*.

Numeral 32 denotes a demodulator which demodulates a signal in accordance with the known CCITT Recommendation V.21. The demodulator 32 receives the signal on a signal line 14*c*, demodulates it and outputs the demodulated data to a signal line 32*a*.

Numeral 34 denotes a demodulator which demodulates a signal in accordance with the CCITT Recommendation V.8. The demodulator 34 receives the signal on the signal line 14*c*, demodulates it and outputs the demodulated data to a signal line 34*a*.

Numeral 36 denotes a Q·PSK demodulator for the protocol between image transmission pages using the CCITT Recommendation V.34 high speed modem. The demodulator 36 receives the signal on the signal line 14*c*, Q·PSK demodulates it and outputs the demodulated data to a signal line 36*a*.

Numeral 38 denotes a demodulator which demodulates a signal in accordance with the known CCITT Recommendation V.27 ter (phase difference modulation), V.29 (quadrature modulation) or V.17. The demodulator 38 receives the signal on the signal line 14*c*, demodulates it and outputs the demodulated data to a signal line 38*a*.

Numeral 40 denotes a demodulator which demodulates a signal in accordance with the CCITT Recommendation V.34. The demodulator 40 receives the signal on the signal line 14*c*, demodulates it and outputs the demodulated data to a signal line 40*a*.

Numeral 42 denotes a decoder circuit which receives the signal outputted to the signal line 38*a* when the signal level '0' is outputted to a signal line 54*h*, receives the signal outputted to the signal line 40*a* when the signal level '1' is outputted to the signal line 54*h*, and outputs encoded data (MH (modified Huffmann) encoded, MR (modified READ) encoded or MMR (modified modified READ) encoded data) to a signal line 42*a*.

Numeral 44 denotes a record circuit which receives the data outputted to the signal line 42*a* and sequentially records it one line at a time.

Numeral 46 denotes a circuit which stores communication systems (particularly, the communication systems in accordance with V.21, V.27 ter, V.29 and V.17 or the communication systems in accordance with V.8 and V.34) in association with a telephone number of a transmit station (copartner or calling station) sent between call signals.

Numeral 48 denotes a circuit which stores the data of registration of the communication system through a signal line 48*a* in association with the telephone number of the calling station sent between call signals.

Numeral 50 denotes a circuit which counts the number of times of communication (reception) after the registration of the communication system through a signal line 50*a* in association with the telephone number of the calling station sent between call signals.

Numeral 52 denotes a console unit having a registration button used to store the communication system in association with the telephone number of the calling station sent between call signals, a ten-key, one-touch dial keys, abbreviation dial keys, a sent key, a start key and other function keys. The information corresponding to the depressed key is outputted to a signal line 52*a*.

Numeral 54 denotes a control circuit which, in the facsimile apparatus capable of detecting the telephone number information sent between call signals, has means for storing the information of the communication system for the calling station in accordance with the telephone number information and call signal detection means and primarily controls the start of the communication by the stored communication system in accordance with the telephone number information sent between call signals when the call signal is detected. The communication systems may be the communication systems based on V.21, V.27 ter, V.29 and V.17 or the communication systems based on V.8 and V.34.

Figure 2:
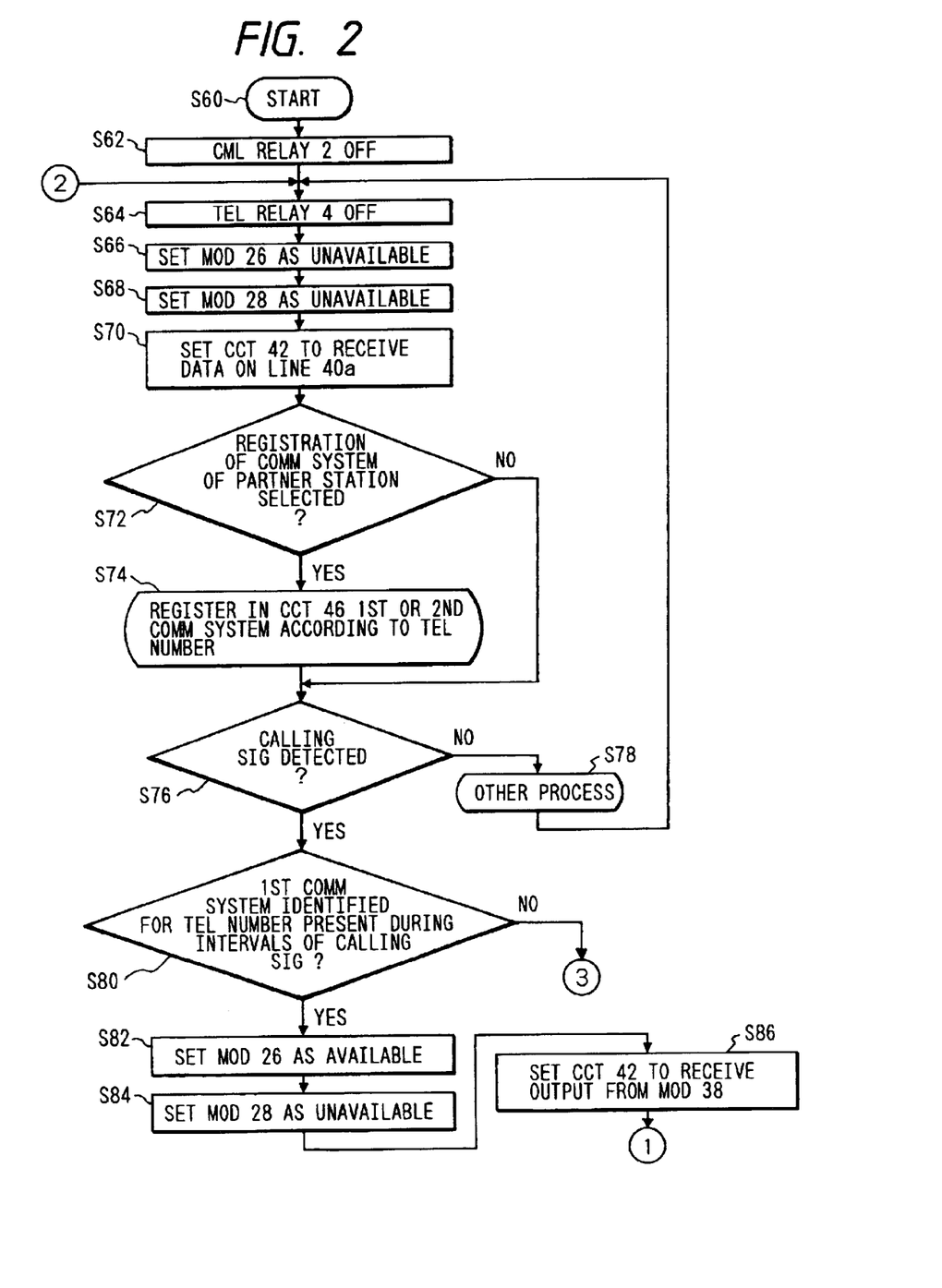
FIG. 2 is a flow chart of the control steps of a control circuit 54 of FIG. 1B.
Figure 3:
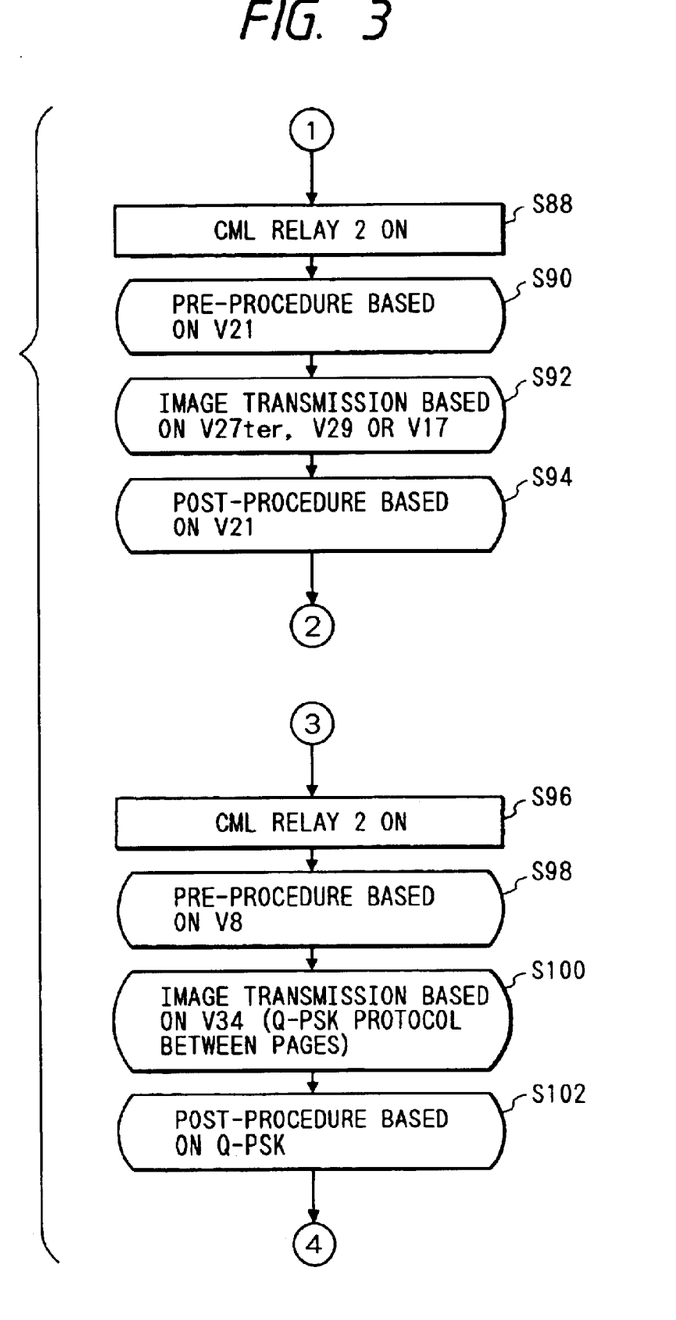
FIG. 3 is a flow chart of the control steps of the control circuit 54 of FIG. 1B.

FIGS. 2 and 3 are flow charts of the control steps of the control circuit 54. The circuits 48 and 50 are not used here.

In FIG. 2, a step S60 represents the start.

In a step S62, the signal level '0' is outputted to the signal line 54*a* to turn of the CML relay 2, that is, connect the signal lines 2*a* and 2*b* to the signal lines 10*a* and 10*b*.

In a step S64, the signal level '0' is outputted to the signal line 54*b* to turn off the TEL relay 4, that is, connect the signal lines 6*a* and 6*b* to the signal lines 8*a* and 8*b*.

In a step S66, the signal level '0' is outputted to the signal line 54*f* to set a state which does not use the V.27 ter, V.29 or V.17 modulator 26.

In a step S68, the signal level '1' is outputted to the signal line 54*g* to set a state which uses the V.34 modulator 28.

In a step S70, the signal level '1' is outputted to the signal line 54*h* to set a state in which decoder circuit 42 receives the signal on the signal line 40*a*.

In a step S72, whether the registration of the communication system in association with the telephone number between call signals has been selected or not is determined, and if the registration has been selected, the process proceeds to a step S74 to register the communication system (the first communication system based on V.21, V.27 ter, V.29 and V.17 or the second communication system based on V.8 and V.34) in association with the telephone number of the call signal to the circuit 46, and if the registration has not been selected, the process proceeds to a step S76.

In the step S76, the information on the signal line 10*a* is received and whether the call signal has been detected or not is determined. If the call signal has been detected, the process proceeds to a step S80, and if the call signal has not been detected, the process proceeds to a step S78 to execute other processes.

In the step S80, the information of the circuit 46 is checked to determine whether the telephone number between call signals is for the first communication system based on V.21, V.27 ter, V.29 and V.17, and if it is for the first communication system based on V.21, V.27 ter, V.29 and V.17, the process proceeds to a step S82, and if it is for the second communication system based on V.8 and V.34, the process proceeds to a step S96.

In the step S82, the signal level '1' is outputted to the signal line 54f to set a state which uses the V.27 ter, V.29 or V.17 modulator 26.

In the step S84, the signal level '0' is outputted to the signal line 54g to set a state which does not use the V.34 modulator 28.

In a step S86, the signal level '0' is outputted to the signal line 54h to set a state in which the decoder circuit 42 receives the information on the signal line 38a.

In a step S88 of FIG. 3, the signal level '1' is outputted to the signal line 54a to turn on the CML relay 2.

A step S90 represents a pre-protocol based on V.21.

A step S92 executes image transmission in accordance with V.27 ter, V.29 or V.17.

A step S94 executes a post protocol based on V.21.

In a step S96, the signal level '1' is outputted to the signal line 54a to turn on the CML relay 2.

A step S98 executes a pre-protocol based on V.8.

A step S100 executes image transmission in accordance with V.34. A Q·PSK protocol is executed between pages.

A step S102 executes a post protocol in accordance with Q·PSK.

In accordance with the Embodiment 1, the communication system information of the calling station is stored in the memory circuit 46 in association with the telephone number between call signals which allows the identification of the telephone number of the calling station prior to the line connection, the telephone number between call signals is detected before the line connection, the communication system information of the calling station for the detected telephone number is read from the memory circuit 46, the communication system information of its own apparatus is set to be compatible to the communication system information of the calling station before the line connection, and the communication is started. Thus, in the apparatus having a plurality of totally different communication systems such as the communication system based on V.27 ter, V.29 and V.17 and the communication system based on V.34, the pre-protocol with the calling station can be shortened and the communication cost can be reduced. (In apparatus having totally different communication systems, normally, the predetermined pre-protocols are sequentially executed for each communication system to detect the communication system of the calling station, and the pre-protocol time is long.)

Further, a chance to misrecognize the communication system of the calling station is reduced.

[Embodiment 2]

In the above embodiment, when the detected telephone number between call signals is not registered in the circuit 46, or when the telephone number is not sent between call signals, the pre-protocol based on V.8 may be executed and the image transmission by V.27 ter, V.29 or V.17 or the image transmission by V.34 may be determined in accordance with the ability of the calling station.

Figure 4:
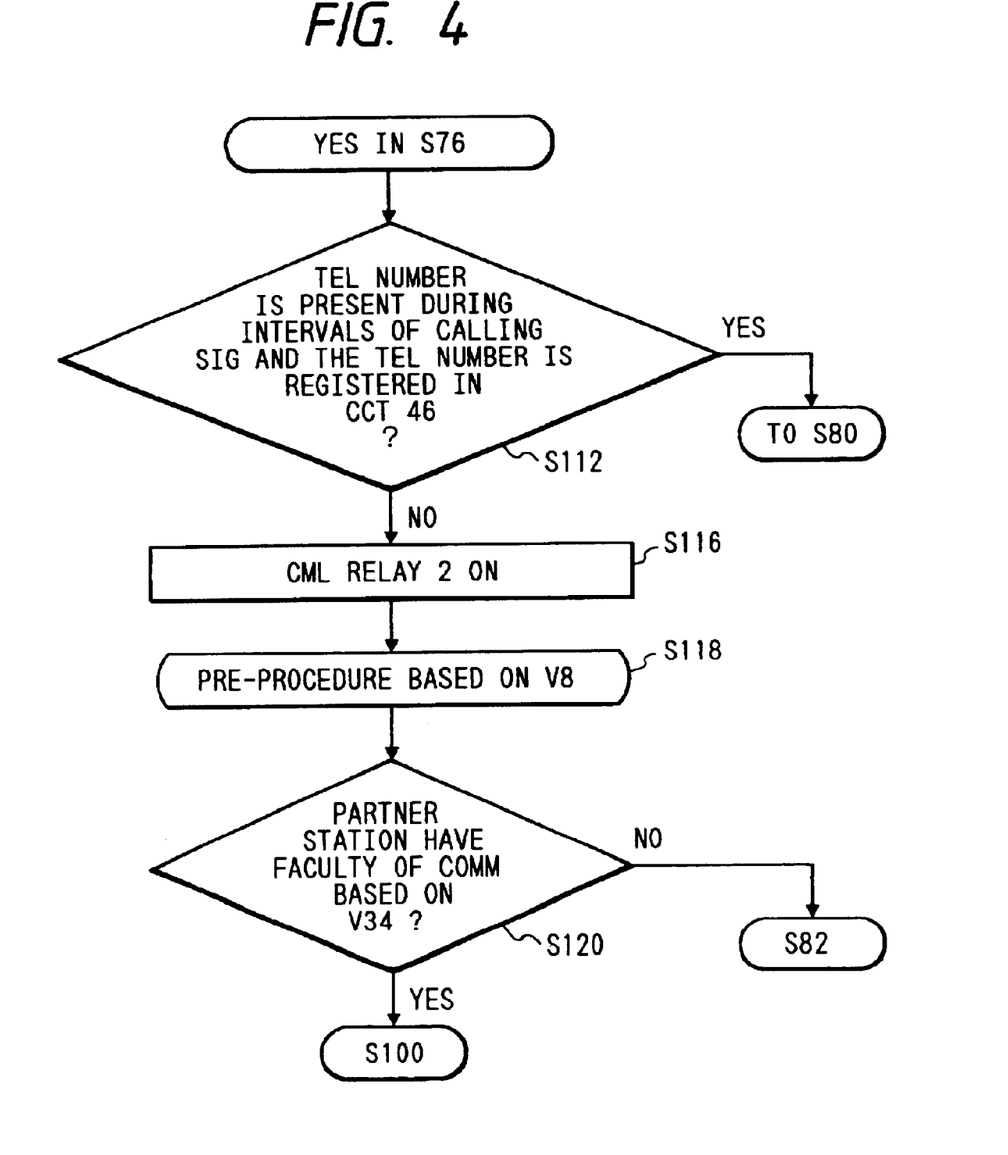
FIG. 4 is a flow chart of the control steps of the control circuit 54 of FIG. 1B.

A specific example of the above control is shown in FIG. 4 for those portions which are different from the flow charts of FIGS. 2 and 3.

In the decision in the step S76 of FIG. 2 is YES, the process proceeds to a step S112.

In the step S112, the information on the signal line 12a is received and whether the telephone number is present between call signals and the detected telephone number is registered in the circuit 46 or not is determined. If YES, the process proceeds to the step S80 of FIG. 2, and if NO, the process proceeds to a step S116.

In a step S116, the signal level '1' is outputted to the signal line 54a to turn on the CML relay 2, that is, connect the signal lines 2a and 2b to the signal lines 14a and 14b.

A step S118 executes a pre-protocol based on V.8. The communication system of the calling station is determined based on the signal received in the V.8 pre-protocol.

In a step S120, whether the V.34 function is equipped or not is determined. If it is equipped, the process proceeds to the step S100 of FIG. 3 to execute the image transmission by V.34, and if it is not equipped, the process proceeds to the step S82 of FIG. 2.

In acccordance with the Embodiment 2, if the telephone number between call signals is not sent or the telephone number of the calling station is not registered, the communication by V.8 is executed so that the communication can be shifted to any communication system. Thus, a case in which the communication with the calling station is not established because the communication system is not identified before the line connection is avoided.

[Embodiment 3]

In the above embodiment, when a call is received from the telephone number between call signals for the first time, the communication may be executed by the communication system which allows any communication system because the mode of the calling station is not known, and that communication system information is stored, and when a predetermined time is elapsed or a predetermined call reception circuit operates, the communication system information is again determined for the same calling station and it is stored.

Figure 5:
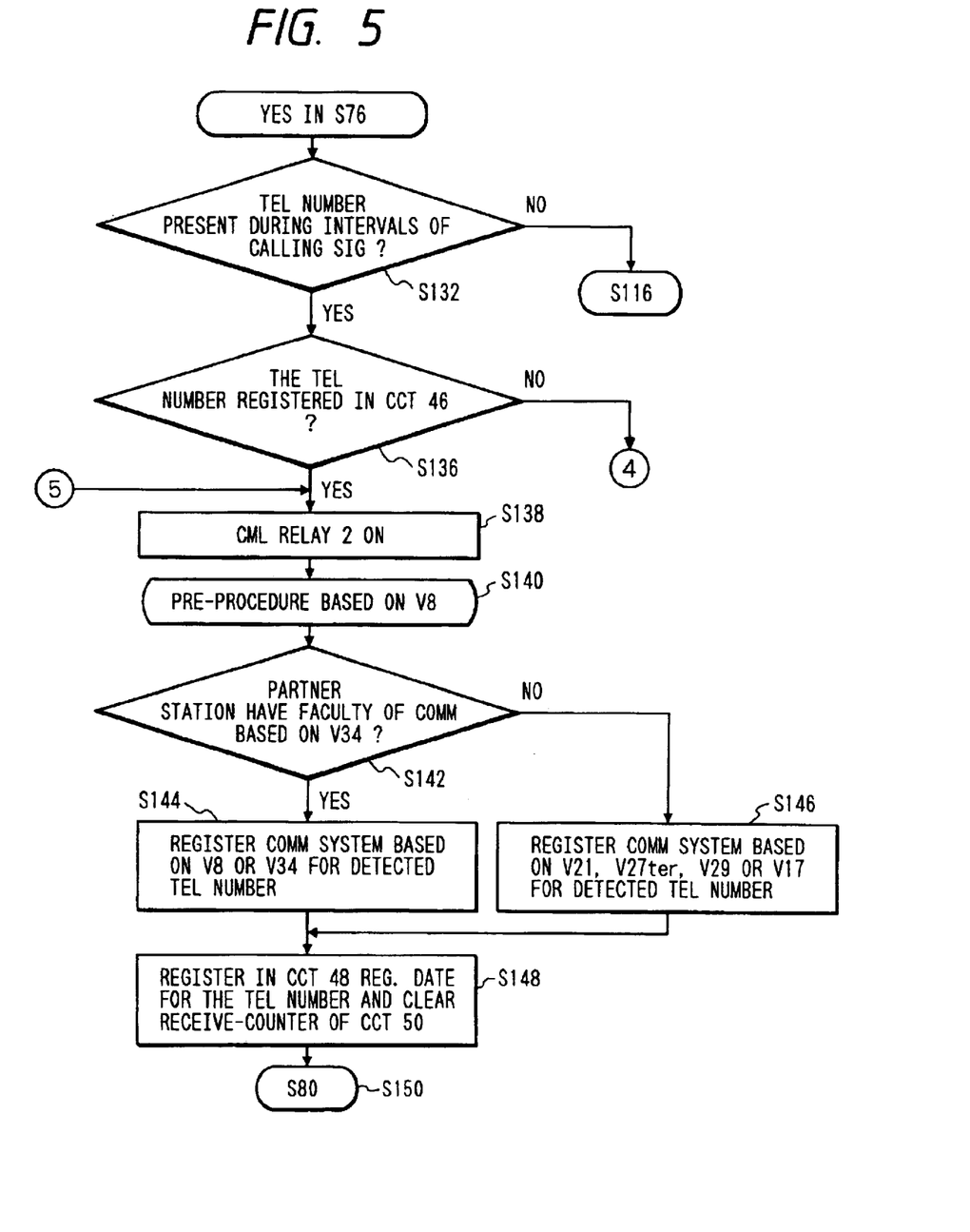
FIG. 5 is a flow chart of the control steps of the control circuit 54 of FIG. 1B.
Figure 6:
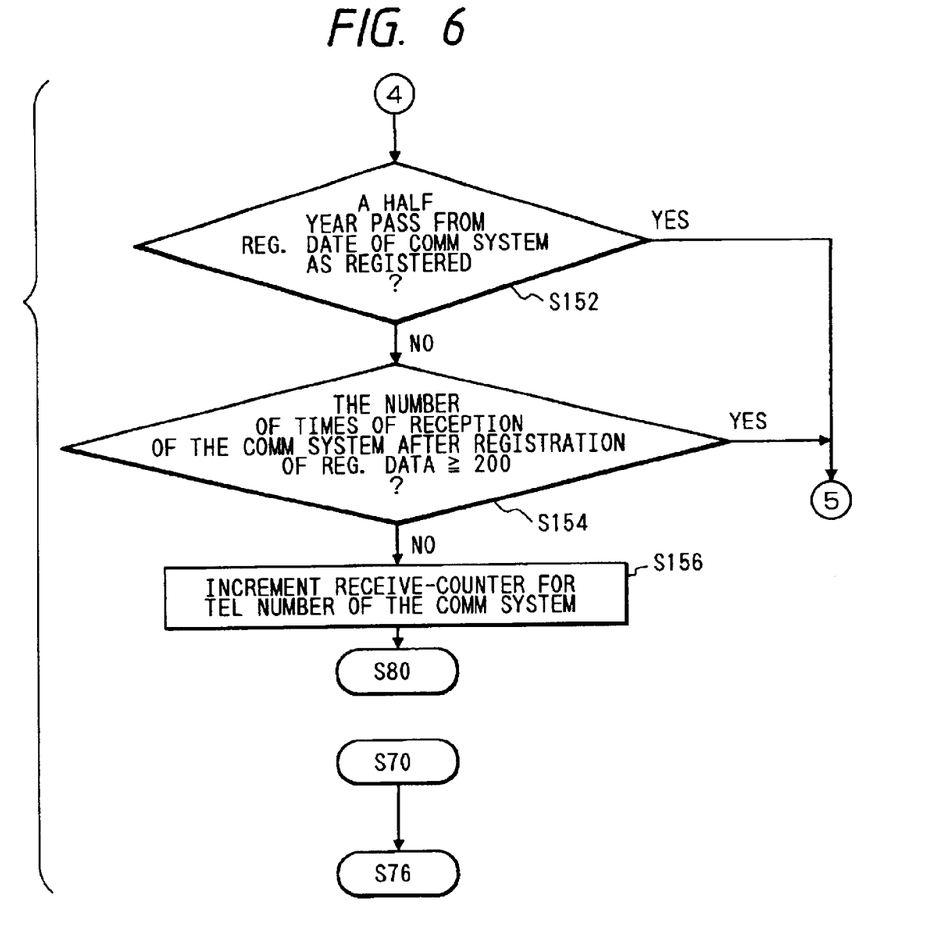
FIG. 6 is a flow chart of the control steps of the control circuit 54 of FIG. 1B.

A specific example of the above control is shown in FIGS. 5 and 6 for those portions which are different from the flow charts of FIGS. 2 and 3.

When the decision in the step S76 of FIG. 2 is YES, the process proceeds to a step S132.

In the step S132, the information on the signal line 12a is received and whether the telephone number between call signals is sent or not is determined. If it is sent, the process proceeds to a step S136, and if it is not sent, the process proceeds to the step S116 of FIG. 4.

In the step S136, whether the telephone number between call signals is registered in the circuit 46 or not is determined. If it is registered, the process proceeds to a step S152, and if it is not registered, the process proceeds to a step S138.

In the step S138, the signal level '1' is outputted to the signal line 54a to turn on the CML relay 2, that is, connect the signal lines 2a and 2b to the signal lines 14a and 14b.

A step S140 executes a pre-protocol based on V.8. In the V.8 pre-protocol, the communication system of the calling station is determined.

In a step S142, whether the V.34 function is equipped or not is determined, and if it is equipped, the process proceeds to a step S144. If it is not equipped, the process proceeds to a step S146.

In the step S144, the communication system by V.8 or V.34 in association with the detected telephone number between call signals is registered.

In the step S146, the communication system by V.21, V.27 ter, V.29 or V.17 in association with the detected telephone number between call signals is registered in the circuit 46.

In a step S148, the date of registration in association with the detected telephone number between call signals is stored in the circuit 48 and a reception counter in the circuit 50 is cleared. Then, the process proceeds to the step S80 of FIG. 3.

In a step S152 of FIG. 6, the information in the circuit 48 is read to determine whether the telephone number between call signals has elapsed one half year from the registration date or not. If it has, the process proceeds to a step S138, and if it has not, the process proceeds to a step S154.

In the step S154, the information in the circuit 50 is read to determine whether the telephone number between call signals has been received over 200 time or not. If it has, the process proceeds to a step S138, and if it has not, the process proceeds to a step S156.

In the step S156, the reception counter is incremented by one in association with the detected telephone number between call signals and it is registered in the circuit 50. Then, the process proceeds to the step S80 of FIG. 2.

The process proceeds from the step S70 of FIG. 2 to the step S76 of FIG. 2 and the steps S72 and S74 are not executed.

In accordance with the Embodiment 4, the communication system by V.8 which permits the shift to any communication system is set for the first communicating calling station to prevent the occurrence of communication error due to incompatibility of the communication system with the calling station at the first communication.

Further, since the communication system information which resulted in the successful communication with the calling station is stored in association with the telephone number of the calling station, the communication system can be established before the line connection at the next communication with that calling station and the pre-protocol time is shortened and the communication cost is reduced.

[Embodiment 4]

In the Embodiment 3, when calling is selected for the telephone number information having the communication system information of the calling station stored in association with the telephone number information between call signals, that communication system information may be stored.

Figure 7:
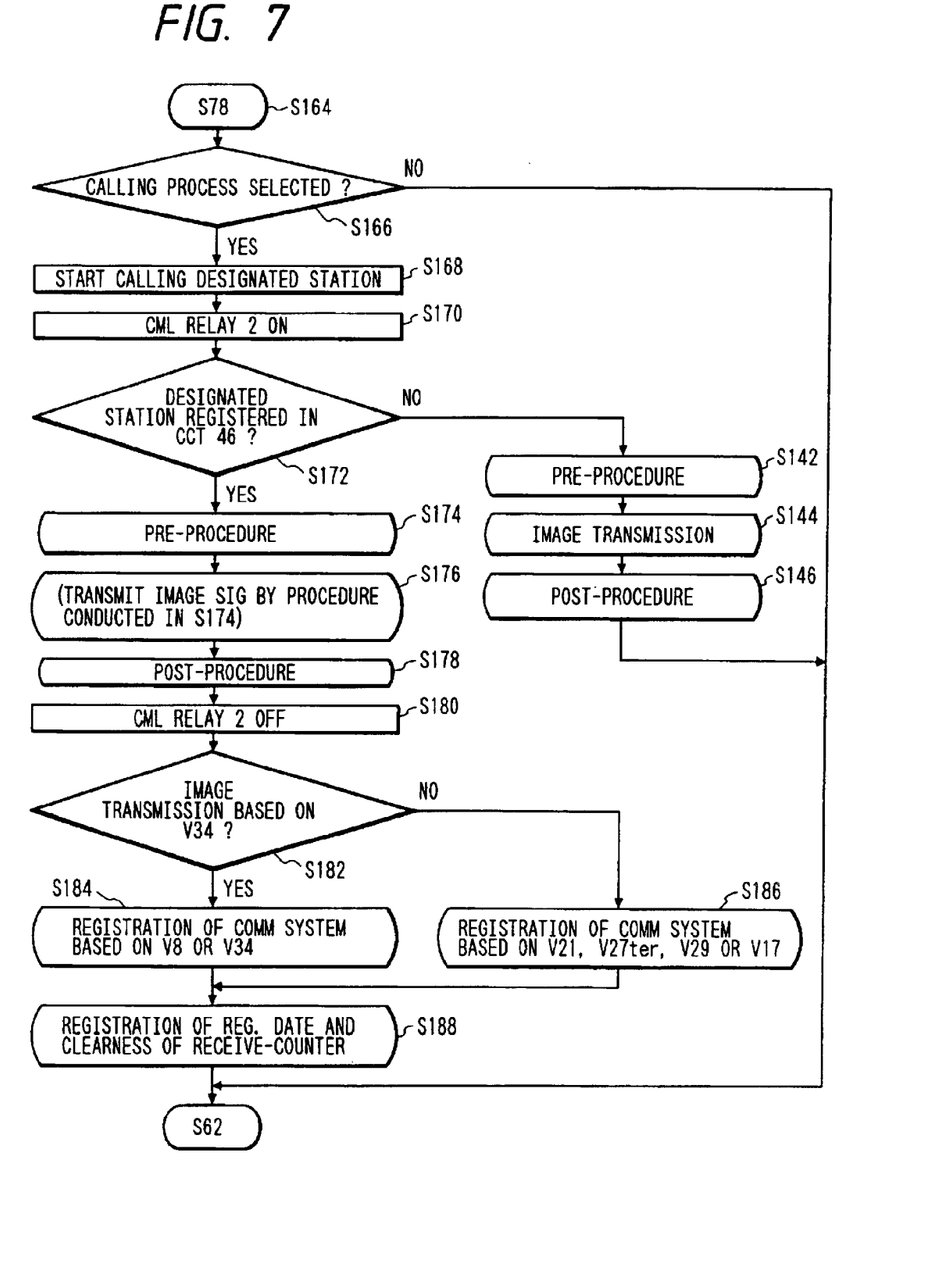
FIG. 7 is a flow chart of the control steps of the control circuit 54 of FIG. 1B.

A specific example of the above control is shown in FIG. 7 for those portions which are different from the control flow charts of FIGS. 5 and 6.

In the Embodiment 4, the process proceeds from the step S78 of FIG. 2 to a step S166.

In the step S166, whether calling has been selected or not is determined. If it has been selected, the process proceeds to a step S168, and if it has not been selected, the process proceeds to the step S62 of FIG. 2.

In the step S168, a designated station is called.

In a step S170, the signal level '1' is outputted to the signal line 54a to turn on the CML relay 2.

In a step S172, whether the designated station is registered in the circuit 46 or not is determined. If it is registered, the process proceeds to a step S174, and if it is not registered, the process proceeds to a step S192.

The step S174 executes a pre-protocol. When the V.8 pre-protocol signal from a called station is to be detected, the V.8 pre-protocol is executed, and when the V.21 protocol signal from the called station is to be detected, the V.21 pre-protocol is executed.

In a step S176, the image transmission is executed. The image is transmitted by the communication system (V.27 ter, V.29, V.17 or V.34) determined in the pre-protocol.

A step S178 executes a post protocol.

In a step S180, the signal level '0' is outputted to the signal line 54a to turn off the CML relay 2.

In a step S182, whether the image transmission was by V.34 or not is determined, and if it was, the process proceeds to a step S184, and if it was by V.27 ter, V.29 or V.17, the process proceeds to a step S186.

The step S184 is same as the step S144 of FIG. 5, the step S186 is same as the step S146 of FIG. 5, and the step S188 is same as the step S148 of FIG. 5. The process proceeds from the step S188 to the step S62 of FIG. 2.

In accordance with the Embodiment 4, when the call is made to the station registered in the circuit 46, the communication system information used for the communication is stored in the circuit 46 in association with the communicated station after the completion of the communication. Thus, the content of the circuit 46 is updated at the transmission and the calling station can rapidly conform to the change of function by the updating of the called station.

[Embodiment 5]

In the Embodiment 4, when the call is selected, the communication system information may be stored even for the telephone number information having the communication system information of the called station not stored, in accordance with the telephone number information between call signals.

Figure 8:
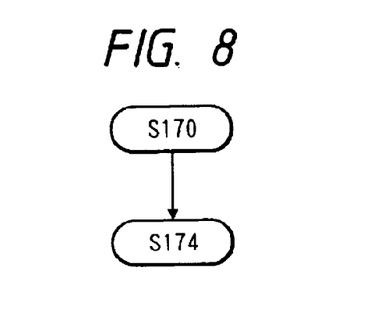
FIG. 8 is a flow chart of the control steps of the control circuit 54 of FIG. 1B.

A specific example of the above control is shown in FIG. 8 for those portions which are different from the control flow chart of FIG. 7.

The process proceeds from the step S170 of FIG. 7 to a step S174.

In accordance with the Embodiment 5, when the call is made to the station not having information stored in the circuit 46, the communication system information used in the communication with the called station is stored in association with the telephone number information of the called station after the completion of the communication. Thus, once called, the communication system information is automatically stored in the circuit 46 and an operator time is saved.

In the embodiments described above, as the communication system information (communication protocol) which is previously stored in association with the telephone number of the calling station received at the time of reception of call, V.21, V.27 ter, V.29 and V.17 (G3 T.30 protocol) and V.8 and V.34 (high speed protocol) have been discussed. However, the protocols to be registered are not limited to those but the protocols of G1, G2, G3, G4, V.8 and V.34 may be added, or the communication protocols of teletex, telex and computer communication in addition to the facsimile apparatus may be added.

It should be understood that the present invention is not limited to the above embodiments and that various modifications may be made.

What is claimed is:

1. A communication apparatus adapted to execute a plurality of kinds of facsimile protocols, said apparatus comprising:

a call signal detector circuit adapted to detect a call signal from a communication line;

an ID detector circuit adapted to detect ID information for identifying a calling station from the communication line before a start of communication with the calling station, when said call signal detector circuit has detected the call signal from the communication line;

a memory adapted to store ID information for identifying a calling station and facsimile protocol information for indicating a facsimile protocol used for communication with that calling station, in correspondence with each other;

a determination circuit adapted to determine whether a predetermined time period has elapsed after the storage of facsimile protocol information corresponding to the ID information detected by said ID detector circuit, into said memory; and a control circuit adapted to perform communication based on the facsimile protocol information stored in the memory in correspondence with the ID information detected by said ID detector circuit, or communication for deciding a facsimile protocol for the calling station, in accordance with the result of determination by said determination circuit, so as to discriminate the facsimile protocol of the calling station, and to perform communication based on the facsimile protocol according to a result of the discrimination and to restore the facsimile protocol information according to that result of the discrimination, in correspondence with the ID information detected by said ID detector circuit.

2. A communication apparatus according to claim 1, further comprising:

a registration circuit adapted to register the ID information of the calling station and the facsimile protocol in said memory in accordance with an instruction from a user.

3. A communication apparatus according to claim 1, wherein the ID information for identifying the calling station is telephone number information, and, wherein when calling has been conducted using the telephone number information stored in said memory, said control circuit is so adapted as to update the facsimile protocol stored in the memory in correspondence with the telephone number used in the calling to store the facsimile protocol that has been executed.

4. A communication apparatus according to claim 1, wherein the facsimile protocol changes with a type of modem used by said communication apparatus.

5. A communication apparatus according to claim 1, wherein the facsimile protocol includes a facsimile protocol using V.21 and V.29 standards and a facsimile protocol using V.8 and V.34 standards.

6. A communication apparatus according to claim 1, wherein said ID detector circuit detects the ID information between receiving successive calling signals.

7. A communication method of a communication apparatus adapted to execute a plurality of kinds of facsimile protocols and having a memory that stores ID information for identifying a calling station and facsimile protocol information for indicting a facsimile protocol used for communication with the calling station, in correspondence with each other, said method comprising:

a call signal detection step, of detecting a call signal from a communication line;

an ID detection step, of detecting ID information for identifying a calling station from the communication line before a start of communication with the calling station, when the call signal has been detected in said call signal detection step;

a determination step for determining whether a predetermined time period has elapsed after the storage of facsimile protocol information corresponding to the ID information detected in said ID detection step, into a memory; and a control step for performing communication based on the facsimile protocol information stored in the memory in correspondence with the ID information detected in said ID detection step, or communication for deciding a facsimile protocol for the calling station, in accordance with the result of a determination made in said determination step, so as to discriminate the facsimile protocol of the calling station, and for performing communication based on the facsimile protocol according to a result of the discrimination and restoring the facsimile protocol information according to that result of the discrimination, in correspondence with the ID information detected in said ID detection step.

* * * * *

UNITED STATES PATENT AND TRADEMARK OFFICE
CERTIFICATE OF CORRECTION

PATENT NO. : 6,888,933 B2
DATED : May 3, 2005
INVENTOR(S) : Takehiro Yoshida

It is certified that error appears in the above-identified patent and that said Letters Patent is hereby corrected as shown below:

Title page,
Item [56], References Cited, U.S. PATENT DOCUMENTS,
"5,438,614 A * 8/1995 Rozman" should read -- 5,436,614 A * 8/1995 Rozman et al. --;
FOREIGN PATENT DOCUMENTS, "05075820 A" should read -- 05-075820 A --.

Column 6,
Line 1, "In" should read -- If --.

Column 7,
Line 13, "200 time" should read -- 200 times --; and
Line 67, "V.29." should read -- V.29, --.

Column 10,
Line 9, "indicting" should read -- indicating --.

Signed and Sealed this

Fourth Day of October, 2005

JON W. DUDAS
*Director of the United States Patent and Trademark Office*